PLATT & ROSECRANS.
Balance Scales.
No. 33,403.
Patented Oct. 1, 1861.
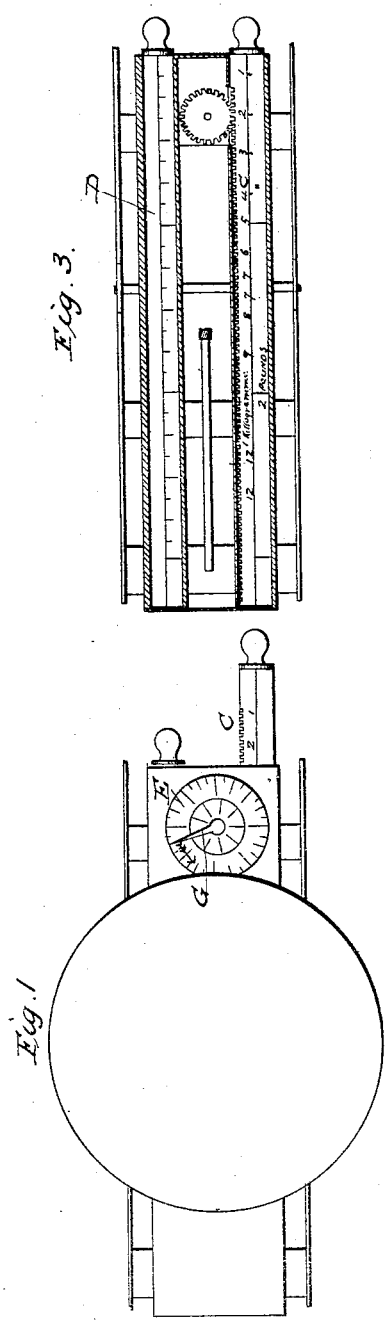
Witnesses
J. S. Brown
R. H. Osgood
Inventors
A. H. Platt
W. S. Rosecrans
By A. H. Platt Atty

UNITED STATES PATENT OFFICE.

ANSON H. PLATT AND WILLIAM S. ROSECRANS, OF CINCINNATI, OHIO.

IMPROVED SCALE AND WEIGHING APPARATUS.

Specification forming part of Letters Patent No. 33,403, dated October 1, 1861.

*To all whom it may concern:*

Be it known that we, ANSON H. PLATT and WILLIAM S. ROSECRANS, of the city of Cincinnati and State of Ohio, have invented a new and Improved Scale or Weighing Apparatus; and we hereby declare the following to be a correct description of the same.

Our invention consists, first, in forming the balance-beam with one or more longitudinal cavities of suitable dimensions to receive sliding bars, which act as weights; second, in using one or more sliding bars moving in and out of these cavities, so graduated as to show the weight balanced by them; third, in using one or more rotary indexes moved by the sliding bar or bars, giving motion to the index or indexes, and one or more circular dial-plates of suitable material, so graduated and marked as to show the subdivisions of the unit of weight indicated on the sliding bar or bars; fourth, in graduating and marking the sliding bar or bars and dial plate or plates when desired, so as to show simultaneously weight according to two or more different systems of weighing, as avoirdupois, Troy, apothecaries', the French decimal system, or any other now in use.

In order to enable any one skilled in the science to construct such an instrument, we subjoin a description of one intended for ordinary domestic use, reference being had to the accompanying drawings.

Upon a suitable form A we place a balance-beam B, supported by ordinary fulcra and containing longitudinal cavities to receive the sliding bars C and D. These sliding bars are divided by transverse lines into equal parts and numbered from the exposed ends 1, 2, 3, &c., toward the other ends, so that by extending either of them from the balance-beam B the space of one of these divisions it will balance one pound avoirdupois, or other unit of weight, placed upon the platform F. Upon the upper surface of that end of the balance-beam from which the sliding bars are extended is placed a circular dial-plate E, graduated on its circumference into sixteen equal parts to represent the number of ounces in a pound, avoirdupois, or into other divisions of the unit, and these divisions can be subdivided to any extent which may be deemed necessary for practical purposes.

Immediately beneath the dial-plate E in the balance-beam B is a pinion or wheel geared into or working against one of the sliding bars, of such a size as to make one revolution while the bar is extended a distance which weighs one pound or other unit placed upon the platform F. This pinion or wheel turns upon a perpendicular axis, the upper end of which perforates the center of the dial-plate E, and has attached to it an index G, adapted to the dial E, so as to indicate accurately upon it all the subdivisions of a pound or other unit as often as the bar is extended a distance adequate to balance a pound upon the platform F.

Nearly over the center of the balance-beam B is placed the platform F, attached and retained in its proper position in the usual way, which completes the structure.

In order to place the axes of the two pinions or wheels concentrically, the rack for the pinion of the decimal system must be geared into the sliding bar a depth equal to the difference of the radii of the pinions, which have the same ratio to each other that the pound has to the kilogram, and in this way even a third system may be represented upon the same machine at the same time.

*Use.*—When gross weight only is required, we place the article to be weighed upon the platform F and extend one or both bars, as the case may require, until the weight is determined; but when the net weight is desired we place the container upon the platform F and extend the bar D until it is balanced. Then we place the article to be weighed in the container and extend the bar C until the whole is balanced, and this bar with the index attached to it will always thus show the net weight. If two different systems of weighing as the French decimal and avoirdupois, are to be used at the same time, as each system has a distinct scale or graduation upon the bars and dial, we have only to weigh and inspect the markings to obtain the weight according to each system.

Advantages.

First. This instrument is small, light, easily handled, and not liable to get out of order.

Second. It does its work with great promptness, simplicity, and accuracy.

Third. It has no separate weights, which are cumbrous to handle and carry and liable to be mislaid and lost.

Fourth. It gives both the tare and net weight at the same time, which obviates errors and perplexity in weighing.

Fifth. It weighs according to two or more different systems at the same time, which is not the case with any other structure of the sort within the knowledge of the inventors.

Sixth. The weight of this instrument for ordinary domestic use with a capacity of forty pounds will not exceed about seven pounds and will weigh with great accuracy from its maximum capacity to one-eighth of an ounce.

Seventh. In conclusion, we would observe that we consider it a most important feature of our invention that by having instruments for common use graduated to both avoirdupois and the French decimal weights it will render easy the introduction of the latter as a substitute for our present awkward and inconvenient modes of weighing—a desideratum in the estimation of scientific and commercial men, from attempting to attain which they have been deterred only by the magnitude of the apparent difficulties of introducing it among the masses—difficulties which will immeasurably disappear by the use of our invention.

We are aware that separate adjusting devices and separate weights have been employed for adjusting scales to counterbalance the tare; but such devices lack the convenience, expedition, and full result of our improved sliding tare poise-bar. Therefore,

What we claim as our invention, and desire to secure by Letters Patent, is—

The employment of the separate sliding tare poise-bar D, in combination with the balance-beam B and weighing poise-bar C, which has two or more different graduations, so as to weigh according to as many different systems of weights at the same time, substantially as herein specified.

ANSON H. PLATT.
WILLIAM S. ROSECRANS.

Attest:
JAS. MCGINNIS,
A. E. ROSECRANS.